United States Patent
Sun et al.

(10) Patent No.: US 9,090,000 B2
(45) Date of Patent: Jul. 28, 2015

(54) INJECTION STRETCH BLOW MOLDED ARTICLES AND RANDOM COPOLYMERS FOR USE THEREIN

(75) Inventors: Luyi Sun, Pearland, TX (US); Mark Leland, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 1003 days.

(21) Appl. No.: 12/411,919

(22) Filed: Mar. 26, 2009

(65) Prior Publication Data

US 2010/0243498 A1    Sep. 30, 2010

(51) Int. Cl.
| | |
|---|---|
| *A61B 19/02* | (2006.01) |
| *B32B 1/00* | (2006.01) |
| *B29C 49/00* | (2006.01) |
| *B29C 49/06* | (2006.01) |
| *B29C 49/10* | (2006.01) |
| *B29K 23/00* | (2006.01) |
| *B29L 31/00* | (2006.01) |

(52) U.S. Cl.
CPC ............ *B29C 49/0005* (2013.01); *B29C 49/06* (2013.01); *B29C 49/10* (2013.01); *B29K 2023/12* (2013.01); *B29L 2031/7158* (2013.01); *Y10T 428/1397* (2015.01)

(58) Field of Classification Search
USPC ................. 264/532; 428/35.7, 36.6
See application file for complete search history.

(56) References Cited

U.S. PATENT DOCUMENTS

| | | | |
|---|---|---|---|
| 4,522,930 A | 6/1985 | Albizzati et al. | |
| 4,693,990 A | 9/1987 | Hiroyuki et al. | |
| 4,904,628 A | 2/1990 | Albizzati et al. | |
| 4,975,403 A | 12/1990 | Ewen et al. | |
| 4,990,477 A | 2/1991 | Kioka et al. | |
| 5,286,540 A | 2/1994 | Suga et al. | |
| 5,641,848 A | 6/1997 | Giacobbe et al. | |
| 6,630,538 B1 | 10/2003 | Ellul et al. | |
| 6,716,939 B2 | 4/2004 | Morini et al. | |
| 6,733,717 B1 | 5/2004 | Marczinke et al. | |
| 6,818,583 B1 | 11/2004 | Morini et al. | |
| 6,825,309 B2 | 11/2004 | Morini et al. | |
| 6,914,153 B2 | 7/2005 | Morini et al. | |
| 6,930,149 B2 | 8/2005 | Haerkoenen et al. | |
| 7,005,487 B2 | 2/2006 | Balbontin et al. | |
| 7,074,871 B2 | 7/2006 | Cecchin et al. | |
| 2004/0122191 A1 | 6/2004 | Arjunan et al. | |
| 2005/0148720 A1 | 7/2005 | Li et al. | |
| 2006/0279026 A1 | 12/2006 | Thierry-Mieg et al. | |
| 2007/0055027 A1 | 3/2007 | Thorman | |
| 2008/0139717 A1 | 6/2008 | Brasel et al. | |
| 2008/0152851 A1* | 6/2008 | McKeeman et al. | 428/35.7 |
| 2008/0161515 A1 | 7/2008 | Blackmon et al. | |
| 2009/0057961 A1* | 3/2009 | McKeeman et al. | 264/532 |

FOREIGN PATENT DOCUMENTS

JP    2003137245    *    5/2003

OTHER PUBLICATIONS

Bassell Press Release, Basell Corporate Communications, May 22, 2007, 3 pages.
Musgrave, Mike, et al., U.S. Appl. No. 11/906,605, filed Oct. 2, 2007, "Propylene Based Polymers for Injection Stretch Blow Molding."
Sun, Luyi, et al., U.S. Appl. No. 11/999,843, filed Jan. 22, 2008, "Low Melt Flow Rate (MFR) Propylene Based Polymers for Injection Stretch Blow Molding."
Sun, Luyi, et al., U.S. Appl. No. 12/411,684, filed Mar. 26, 2009, "Injection Stretch Blow Molded Articles and Syndiotactic Polymers for Use Therein."

* cited by examiner

*Primary Examiner* — Ellen S Wood

(57) ABSTRACT

Injection stretch blow molded (ISBM) articles and methods of forming the same are described herein. The ISBM articles generally include a metallocene random propylene-based copolymer.

16 Claims, 1 Drawing Sheet

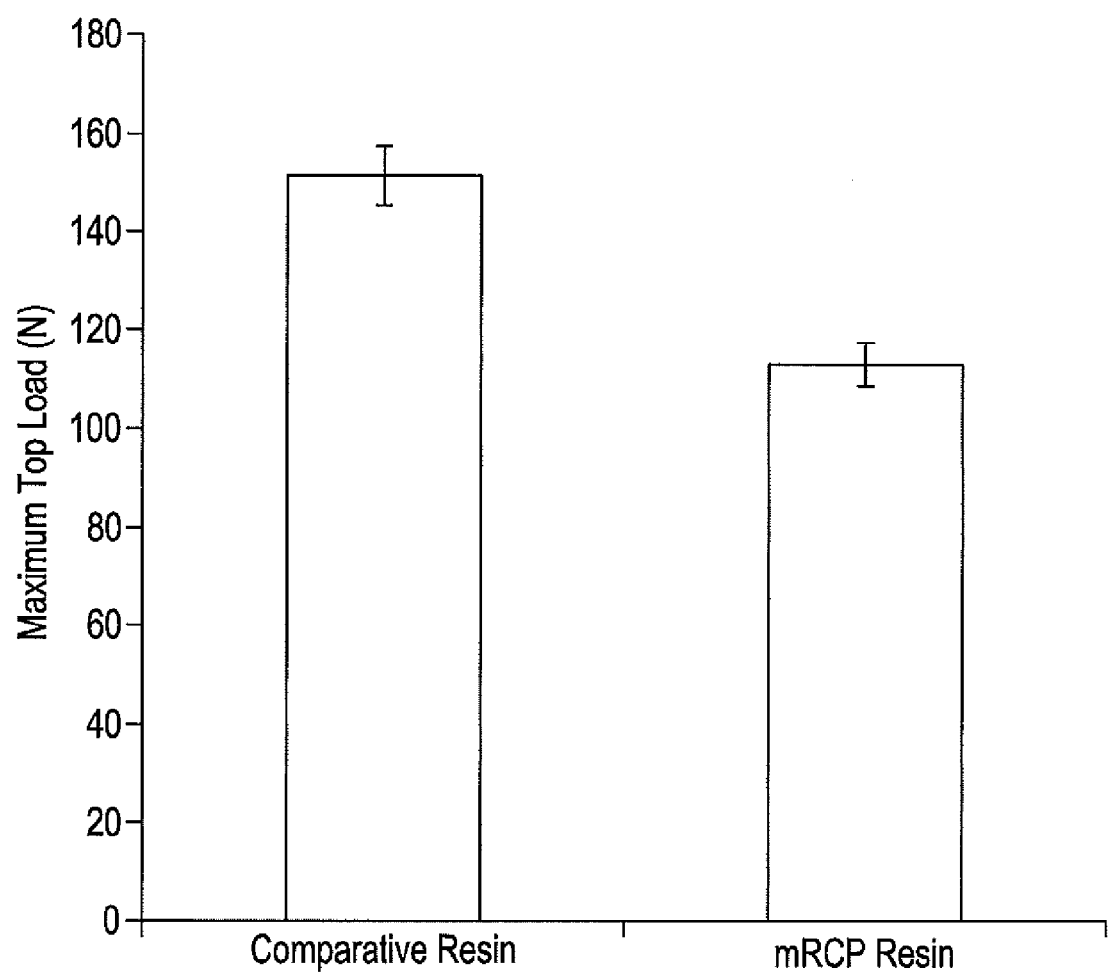

INJECTION STRETCH BLOW MOLDED ARTICLES AND RANDOM COPOLYMERS FOR USE THEREIN

FIELD

Embodiments of the present invention generally relate to polymers adapted for use in injection stretch blow molding. In particular, embodiments of the invention relate to metallocene random propylene-based copolymers adapted for use in injection stretch blow molding.

BACKGROUND

Attempts have been made to utilize propylene based random copolymers for injection stretch blow molding (ISBM) applications. However, in order to achieve high clarity, the ISBM grade polypropylene resins are usually clarified by sorbitol based clarifiers, which are not desirable for medical applications. In addition, the polypropylene (PP) ISBM process is more demanding than polyethylene terephthalate (PET) ISBM process, especially during the re-heating stage.

Therefore, a need exists for developing resins which can be more easily reheated during the ISBM process and will result in ISBM articles exhibiting high clarity without the use of undesirable clarifiers.

SUMMARY

Embodiments of the present invention include injection stretch blow molded (ISBM) articles. The ISBM articles generally include a metallocene random propylene-based copolymer.

Embodiments of the invention further include injection stretch blow molded (ISBM) medical and cosmetic packaging and flexible containers that include a metallocene random propylene-based copolymer which exhibits a melt flow rate of from about 1 dg/min to about 40 dg/min., a melting point less than 130° C., a haze of less than 5%, and a gloss at 45° greater than 75%.

Embodiments further include methods of forming injection stretch blow molded (ISBM) articles which include providing a metallocene random propylene-based copolymer, injection molding the propylene-based impact copolymer into a preform and stretch-blowing the preform into an article.

BRIEF DESCRIPTION OF DRAWINGS

FIG. 1 illustrates graphically the maximum top load strength of ISBM articles.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

Various ranges are further recited below. It should be recognized that unless stated otherwise, it is intended that the endpoints are to be interchangeable. Further, any point within that range is contemplated as being disclosed herein.

As used herein, "opaque" means an article is impenetrable to visible light that is, an opaque object prevents transmission of essentially all visible light. "Transparent" means essentially all visible light passes through the article. The term "semi-opaque" means some, but not all, visible light passes through the article.

As used herein, "haptics" refers to the sensations produced by skin contact with foreign material, such as cloth or plastic. Therefore, "good haptics", as used herein, refers to the feel of a bottle when held, such as the softness of a bottle.

Catalyst Systems

Catalyst systems useful for polymerizing olefin monomers include any catalyst system known to one skilled in the art. For example, the catalyst system may include metallocene catalyst systems, single site catalyst systems, Ziegler-Natta catalyst systems or combinations thereof, for example. As is known in the art, the catalysts may be activated for subsequent polymerization and may or may not be associated with a support material. A brief discussion of such catalyst systems is included below, but is in no way intended to limit the scope of the invention to such catalysts.

For example, Ziegler-Natta catalyst systems are generally formed from the combination of a metal component (e.g., a catalyst) with one or more additional components, such as a catalyst support, a cocatalyst and/or one or more electron donors, for example.

Metallocene catalysts may be characterized generally as coordination compounds incorporating one or more cyclopentadienyl (Cp) groups (which may be substituted or unsubstituted, each substitution being the same or different) coordinated with a transition metal through $\pi$ bonding. The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359, 072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g. ethylene, propylene, butene, pentene, methylpentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In an embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any method known to one skilled in the art, such as via a double-jacketed pipe or heat exchanger, for example.

In an embodiment, a process for producing a copolymer may be carried out that includes polymerizing in a linear liquid slurry or gas phase reactor in the presence of a polymerization catalyst that involves injecting at least one olefin comonomer at more than one point along the length of the reactor. (See, for example, U.S. Pat. No. 7,053,163 which is incorporated by reference herein.)

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example.

Unless otherwise designated herein, all testing methods are the current methods at the time of filing.

In one or more embodiments, the polymers include propylene based polymers. As used herein, the term "propylene based" is used interchangeably with the terms "propylene polymer" or "polypropylene" and refers to a polymer having at least about 50 wt. %, or at least about 70 wt. %, or at least about 75 wt. %, or at least about 80 wt. %, or at least about 85 wt. % or at least about 90 wt. % polypropylene relative to the total weight of polymer, for example.

The propylene based polymers may have a molecular weight distribution ($M_n/M_w$) of from about 1.0 to about 20, or from about 1.5 to about 15 or from about 2 to about 12, for example.

In one embodiment, the propylene polymer has a microtacticity of from about 89% to about 99%, for example.

In one embodiment, propylene based polymers may have a recrystallization temperature ($T_c$) (as measured by DSC) range of 70-120° C., or from 80 to 110° C., or from 85 to 100° C.

In one embodiment, propylene based polymers may have a molecular weight ($M_w$) range of 150,000 to 230,000, or from 170,000 to 210,000, or from 180,000 to 200,000 (as measured by gel permeation chromatography).

The propylene based polymers may have a melting point ($T_m$) (as measured by DSC) of at least about 105° C., or from about 115° C. to about 175° C., for example.

The propylene based polymers may include about 15 wt. % or less, or about 12 wt. % or less, or about 10 wt. % or less, or about 6 wt. % or less, or about 5 wt. % or less, or about 4 wt.

% or less of xylene soluble materials (XS), for example (as measured by ASTM D5492-06).

The propylene based polymers may have a melt flow rate (MFR) (as measured by ASTM D-1238) of from about 0.01 dg/min to about 1000 dg/min., or from about 0.01 dg/min. to about 100 dg/min., for example. The propylene based random copolymers may exhibit a melt flow rate of at least about 1 dg./min., or from about 5 dg./min. to about 30 dg./min. or from about 10 dg./min. to about 20 dg./min., for example.

In one or more embodiments, the propylene based polymers have a low melt flow rate (MFR). As used herein, the term low melt flow rate refers to a polymer having a MFR of less than about 10 dg/min., or less than about 6 dg/min., or less than about 2.6 dg/min., or from about 0.5 dg/min. to less than 10 dg/min. or from about 0.5 dg/min. to about 6 dg/min., for example.

In one or more embodiments, the polymers include propylene based random copolymers. Unless otherwise specified, the term "propylene based random copolymer" refers to those copolymers composed primarily of propylene and an amount of at least one comonomer, wherein the polymer includes at least about 0.5 wt. %, or at least about 0.8 wt. %, or at least about 2 wt. %, or from about 0.5 wt. % to about 5.0 wt. %, or from about 0.6 wt. % to about 1.0 wt. % comonomer relative to the total weight of polymer, for example. The comonomers may be selected from $C_2$ to $C_{10}$ alkenes. For example, the comonomers may be selected from ethylene, propylene, 1-butene, 1-pentene, 1-hexene, 1-heptene, 1-octene, 1-nonene, 1-decene, 4-methyl-1-pentene and combinations thereof. In one specific embodiment, the comonomer includes ethylene. Further, the term "random copolymer" refers to a copolymer formed of macromolecules in which the probability of finding a given monomeric unit at any given site in the chain is independent of the nature of the adjacent units.

In one embodiment, additives may also be included in the final composition. The additives may contact the polymer by any method known to one skilled in the art. For example, the additives may contact the polymer prior to extrusion (within the polymerization process) or within the extruder, for example. In one embodiment, the additives contact the polymer independently. In another embodiment, the additives are contacted with one another prior to contacting the polymer. In one embodiment, the contact includes blending, such as mechanical blending, for example.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheet, thermoformed sheet, geomembranes and pond liners, for example. Molded articles include single and multilayered constructions in the form of bottles, tanks, large hollow articles, rigid food containers and toys, for example.

In one or more embodiments, the polymers are utilized in injection stretch blow molding (ISBM) processes to form ISBM articles. The ISBM articles may include thin-walled bottles and other types of containers, for example. The ISBM articles may be formed by any suitable process. For example, ISBM processes may include injecting the polymer into a preform and subsequently stretch-blowing the preform into the desired final form, for example.

In one or more embodiments, the metallocene random propylene based copolymers, as described above, are utilized to form the ISBM articles.

In one or more embodiments, the ISBM articles are medical grade or cosmetic grade articles. In one or more embodiments, the ISBM articles are bottles. Such cosmetic packaging could include products such as viscose lotions, pastes, and drops, for example.

The articles formed from the metallocene random propylene-based copolymers exhibit high clarity, article flexibility, and good haptics, without the use of clarifiers.

In one or more embodiments, the ISBM articles exhibit high clarity. For example, the ISBM articles may exhibit a haze of less than 15%, or less than 10%, or less than 5%, or less than 2% (as measured by ASTM D1003).

In one or more embodiments, the ISBM articles exhibit high gloss. For example, the ISBM articles may exhibit a gloss at 450 of greater than 50%, or greater than 65%, or greater than 75% (as measured by ASTM D2457).

In one or more embodiments, the ISBM (e.g., 23 g) articles may exhibit a maximum top load, as measured by ASTM D2659, of at least about 70 N, or at least about 100 N or at least about 110 N, for example.

In one or more embodiments, the article is stretch-blown at a production rate of at least about 500 articles per hour per cavity, or from 750 to 2000 articles per hour per cavity, or from 1000 to 1500 articles per hour per cavity.

EXAMPLES

The mRCP Resin refers to TOTAL Petrochemicals EOD02-15, which is a metallocene random propylene-based copolymer having a melting point of approximately 119° C. and is commercially available from TOTAL Petrochemicals USA, Inc.

Comparative Resin refers to TOTAL Petrochemicals 7525MZ, which is a propylene based random copolymer having a MFR of 10 dg/min., and which is commercially available from TOTAL Petrochemicals USA, Inc.

The polymer samples were injection stretch blow molded (ISBM) into bottles. The bottles were then tested for top load and optical properties.

The preforms were prepared as follows. The mRCP Resin was injection molded into 23 g preforms on the Netstal injection molder under the injection molding conditions listed in Table 1. The preforms were conditioned at room temperature for at least 24 hours before they were stretch-blow-molded into bottles on ADS G62 linear injection stretch blow molder.

TABLE 1

Preform injection-molding condition.

| Resin | mRCP Resin | Comparative Resin |
|---|---|---|
| Preform Weight | 23 g | 23 g |
| Barrel temperature (° C.) | 230 | 250 |
| Hot runner temperature (° C.) | 230 | 250 |
| Mold temperature (static/move) (° C.) | 10/10 | 10/10 |

TABLE 1-continued

Preform injection-molding condition.

| Resin | mRCP Resin | Comparative Resin |
|---|---|---|
| Injection speed (mm/s) | 5 | 5 |
| Cooling time (s) | 15 | 15 |
| Hold time (s) | 15 | 4 |
| Cycle time (s) | ca. 38.8 | ca. 26.6 |

Because of the mRCP Resin's low melting point, it was injection molded at a relatively low barrel and hot runner temperature setting of 230° C.

The mRCP Resin preforms were blow molded into bottles without any issue (reject rate <1%) at both 1000 and 1500 bottles/hour/cavity. During the evaluation, it was observed that the mRCP Resin preforms could be blow molded using a much lower heating profile as expected. In addition, the preforms required a much lower blow pressure than regular isotactic polypropylene resins. The molded bottles were very clear but felt soft. In order to estimate the energy saving for processing the mRCP Resin, a Comparative Resin was used for comparison.

It should be noted that there are numerous combinations of heater outputs that can lead to a similar heating effect and a low reject rate (<1%). In order to have a consistent comparison, it is necessary to use a similar type of temperature profile (similar distribution of heating power along the preform). Thus, the temperature profile optimization on the mRCP Resin was started from the pre-optimized profile for the Comparative Resin. By gradually reducing the temperature settings on individual heaters, an optimized temperature profile for the mRCP Resin was obtained. Note that the optimized temperature profile for each material requires that the resulting bottles exhibit uniform wall thickness and minimal defects based on visual inspection. The optimized temperature profiles for the two preforms are displayed in Table 2.

TABLE 2

Optimized temperature profile for Comparative Resin and mRCP Resin (1000 bottles/h/cavity).

| | Comparative Resin | | mRCP Resin | |
|---|---|---|---|---|
| Lamps | Oven 10 | Oven 20 | Oven 10 | Oven 20 |
| L1 (W) | 1550 | 1250 | 1400 | 1200 |
| L2 (W) | 1350 | 900 | 500 | 400 |
| L3 (W) | 350 | 350 | 300 | 200 |
| L4 (W) | 450 | 350 | 500 | 400 |
| L5 (W) | 1350 | 600 | 700 | 350 |
| L6 (W) | 250 | 250 | 400 | 300 |
| L7 (W) | 150 | 150 | 400 | 300 |
| Total (W) | 5450 | 3850 | 4200 | 3150 |
| Good bottle rate | >99% | | >99% | |
| Energy saving | — | | 21% | |
| Blow Pressure (bar) | 26 | | 8 | |

The results showed that the heat energy required for blowing the mRCP Resin was approximately 21% lower than that for the Comparative Resin. Moreover, the mRCP Resin preforms were successfully blow molded into bottles with an extremely low blow pressure. After temperature profile optimization, the blow pressure was reduced gradually to 8 bar, which is the lower limit of the regulator on the ISBM high pressure gas line. The mRCP Resin bottles were successfully blow molded at 8 bar without any issue. It was also attempted to blow the bottles with the pre-blow pressure (6 bar) only. Again, bottles were successfully formed. However, using only the 6 bar pre-blow pressure the engraving on the bottle was not very clear.

The mRCP Resin bottles blow molded under the conditions listed in Table 2 were tested for top load and clarity. The results) provided in Table 3, and illustrated in FIG. 1 for maximum top load, showed that the top load strength of the mRCP Resin bottles was lower than the Comparative Resin bottles. But the bottles were highly flexible and had a soft touch, which would be beneficial in certain applications. In addition, the bottles exhibited high gloss and low haze, without the need of any clarifiers.

TABLE 3

Mechanical and optical properties of 23 g mRCP Resin and Comparative Resin bottles.

| | Maximum Top load (N) | Bumper compression at 0.50 inch deflection (N) | Gloss (%) | Haze (%) |
|---|---|---|---|---|
| mRCP Resin | 112.9 ± 4.4 | 65.8 ± 3.4 | 77.4 ± 5.6 | 1.5 ± 0.4 |
| Comparative Resin | 151.3 ± 5.9 | 78.9 ± 5.6 | 81.6 ± 3.0 | 1.1 ± 0.1 |

Note:
the optical properties shown here were measured at bottle sidewall. The Comparative Resin is clarified with a sorbitol based clarifier.

The mRCP Resin demonstrated several beneficial attributes in ISBM applications. Because of its low melting point, the mRCP Resin was successfully blow molded into bottles with a low heat profile (approximately 20% lower than that for the Comparative Resin) and extremely low blow pressure (approximately 70% lower than that for the Comparative Resin). The mRCP Resin bottles possess sufficient top load strength, and the bottles exhibit good flexibility. In addition, although mRCP Resin contains no clarifier, the mRCP Resin bottles exhibit high clarity. The ability to avoid the use of sorbitol based clarifiers in conjunction with the extremely low extractable content of metallocene polypropylene would be beneficial for such applications as medical and cosmetic packaging.

While various embodiments have been shown and described, modifications thereof can be made by one skilled in the art without departing from the spirit and teachings of the disclosure. The embodiments described herein are exemplary only, and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments disclosed herein. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. An injection stretch blow molded (ISBM) article comprising:
a metallocene random propylene-based copolymer in the absence of a clarifier, wherein the propylene-based copolymer has a melting point of from about 115° C. to about 175° C., microtacticity of from about 89% to 99%, and a molecular weight (Mw) of 170,000 to 210,000 and a recrystallization temperature of from 85 to 100° C., as measured by DSC.

2. The ISBM article of claim 1, wherein the metallocene random propylene-based copolymer exhibits a melt flow rate of from about 1 dg/min. to about 40 dg/min.

3. The ISBM article of claim 1, wherein the article has a haze of less than 5%.

4. The ISBM article of claim 1, wherein the article has a gloss at 45° of greater than 75%.

5. The ISBM article of claim 1, wherein the article is a medical packaging container.

6. The ISBM article of claim 1, wherein the article is cosmetic packaging.

7. The ISBM article of claim 1, wherein the article exhibits a maximum top load of at least 100 N at a weight of 23 g.

8. An injection stretch blow molded (ISBM) package or container comprising:
a metallocene random propylene-based copolymer exhibiting a melt flow rate of from about 1 dg/min to about 40 dg/min, and a melting point of from about 115° C. to about 175° C., a microtacticity of from about 89% to about 99%, a molecular weight (Mw) of about 170,000 to 210,000, and a recrystallization temperature of from 85 to 100° C., as measured by DSC;
a top load of at least 100 N at a weight of 23 g;
a haze of less than 5%; and
a gloss at 45° of greater than 75%.

9. A method of forming an injection stretch blow molded (ISBM) article comprising:
providing a metallocene random propylene-based copolymer;
injection molding the metallocene random propylene-based copolymer into a preform; and
stretch-blowing the preform into an article.

10. The method of claim 9, wherein the article is stretch-blown at a production rate of at least about 1000 articles per hour per cavity.

11. The method of claim 10, wherein the article is stretch-blown at a production rate of at least about 1500 articles per hour per cavity.

12. The method of claim 9, wherein the metallocene random propylene-based copolymer exhibits a melt flow rate of from about 1 dg/min. to about 40 dg/min. and a melting point of from 105 to 130° C.

13. The method of claim 9, wherein the article is selected from the group consisting of medical packaging or cosmetic packaging.

14. The method of claim 9, wherein the article has good haptics.

15. The method of claim 9, wherein the stretch-blowing is performed at a pressure of 8 bar.

16. The method of claim 9, wherein the stretch-blowing requires a heat energy of at least 20% less than the heat energy required for similar stretch-blowing of a non-metallocene random propylene-based copolymer.

* * * * *